Patented June 24, 1930

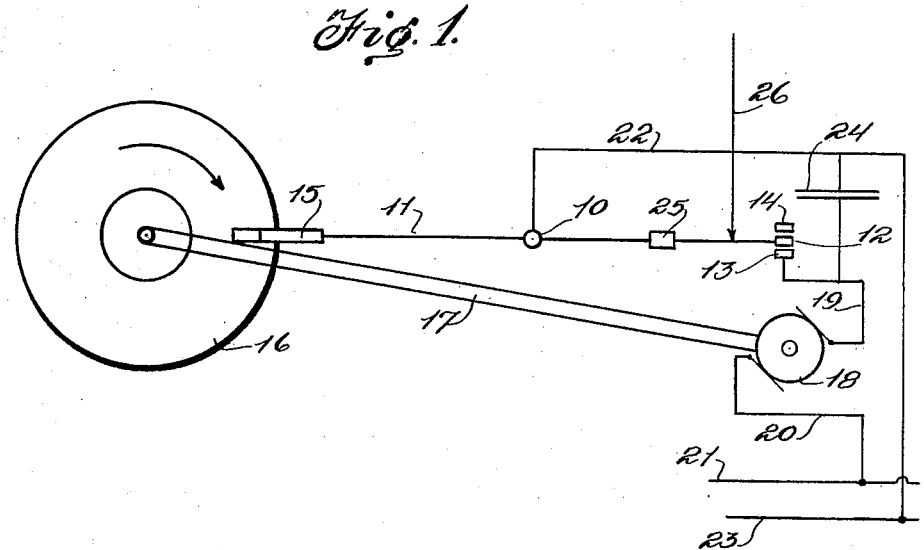
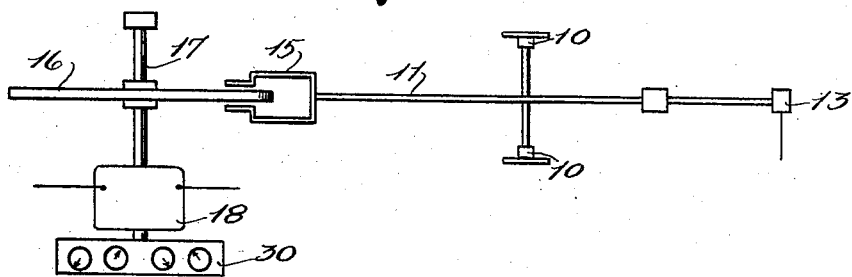
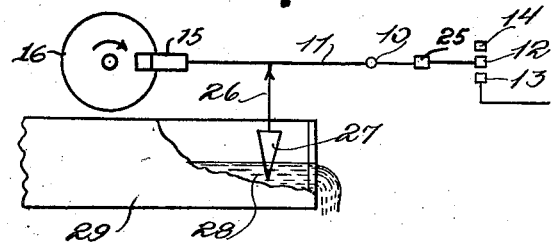
William C. Woodson, Jr., Inventor.

1,766,579

UNITED STATES PATENT OFFICE.

WILLIAM C. WOODSON, JR., OF BROOKLYN, NEW YORK

MEANS FOR PRODUCING SPEEDS PROPORTIONAL TO VARIATIONS IN STATIC FORCE

Application filed August 20, 1928. Serial No. 300,766.

This invention relates to means for producing speeds proportional to variations in a static force.

The principal object of the invention is to provide means for controlling the speed of a variable speed motor, which means are in turn controlled by the application of a static force so that any variations in the static force will correspondingly affect the speed of the motor in such manner that the average speed of the motor will bear a constant ratio to the average static force.

With the above and other objects in view, as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a diagrammatic view in plan of an apparatus constructed in accordance with this invention.

Figure 2 is a similar view in elevation, the wiring being largely omitted.

Figure 3 is a diagrammatic view illustrating the application of the invention to a measuring weir.

Figure 4 is an end view of such a weir.

It is to be understood that the drawings forming part of this specification are purely diagrammatic, no effort being made to illustrate the mechanical details by means of which the device may be physically embodied since such details will vary greatly with the various embodiments and uses of the invention and are simply matters of engineering design. What has been shown, therefore, are diagrammatic illustrations sufficient to enable anyone skilled in the art to understand and construct the invention.

Supported in bearings 10 is a balance arm 11 and as here shown one end of this arm carries a contact 12 which is positioned to swing between a fixed contact 13 and a stop 14. This arm has also connected thereto at its other end a U-shaped magnet 15 and between the poles of this magnet rotates a disk 16 mounted on the shaft 17 of a motor 18. This disk and magnet form simply an electro-magnetic torque device tending to rotate the arm 11 as the rotary member or element of the torque device is rotated by the motor.

Leading from the motor to the contact 13 is a conductor 19 and from the other pole of the motor a wire 20 leads to a line wire 21 or other suitable source of power. From the arm 11 a conductor 22 leads to the other line wire 23 and a condenser 24 is preferably bridged between the conductors 19 and 22. On the arm 11 is preferably mounted a balance weight 25 and applied to this arm by any suitable means is a static force 26. By reference to Figure 3, as an example of such static force, it may be seen that the static force is that caused by the action of a float 27 floating on the water 28 passing through a measuring weir 29. Obviously, as will be presently explained, the static force 26 may be obtained in many other ways.

As an example of a device controlled by the action of the motor there has been shown in Figure 2 a register 30 which, for instance, may be geared to indicate volumes of water as measured by the weir 29.

Inasmuch as the instrument is intended to be very sensitive it is desirable that the arm 11 shall have a total movement as near zero as possible and it is to be noted that the object of the condenser 24 is to limit any sparking which may take place between the contacts 12 and 13 as they make and break.

In the operation of the device the force 26 presses on the arm 11 to bring the contact 12 into engagement with the contact 13. Current will now flow from the wire 21, through wire 20, motor 18, wire 19, contact 13, contact 12, arm 11, wire 22, back to the wire 23. This starts the motor and causes the disk 16 to revolve in the direction of the arrow shown in Figure 1. As the motor and disk rotate the disk cuts the magnetic field of the permanent magnet 15, and, according to the well known laws, the disk will tend to pull the magnet around with it as it rotates. This creates a force on the magnet which tends to rotate the arm 11 against the force 26. Since the field of the magnet is constant, the reactive force between the magnet and disk will, at any instant, be proportional to the speed of the disk. In other words, the pull on the magnet against the action of the force 26 will always be proportional to the speed of the disk.

As the motor and disk speed up this pull will increase until it just balances the force 26. When this happens the contact 12 will move out of engagement with the contact 13 and the motor circuit will be opened. Because of the braking effect of the magnet, the motor will slow down very rapidly. At the instant the motor starts to slow down, the pull on the magnet 15 against the action of the force 26 will decrease and the force 26 will predominate and again close the motor circuit.

The cycle described above will, due to the sensitiveness of the device, repeat itself several times a second with the result that the average speed of the disk and motor will at all times be proportional to the average force 26. For instance, if the force 26 be increased then the motor circuit will remain closed until the motor has been running long enough to pick up a speed proportional to the increase of the force 26. On the contrary, if the force 26 decreases the motor circuit will be opened and will remain open until the speed of the disc has decreased by an amount proportional to the change in the force 26. Because of this sensitiveness to variations in the force 26 the average motor speed will correspond to the average force exerted.

As indications of some of the many applications of this device the following are submitted. If the force 26 is produced by a wattmeter of the Kelvin balance type where in the torque of the wattmeter is proportional to watts, the speed of the disk will be proportional to watts and, when the proper ratio of gearing is used on the register 30, that register will read in watthours over any period of time and the device will thus become a watthour meter. Obviously, the force 26 may be derived from an ammeter of the Kelvin balance type or of the D'Arsonval type and in this case the register 30 with proper gearing will read in ampere hours over any period of time. If the force 26 is derived from an arrangement such as in Figure 3 and a properly shaped float is used the reading of the register will be proportional to the volume or the weight of water according to the dialing on the register. Other fluid meters may be operated in similar manner and even clock-work may be maintained at a uniform speed, as for instance when the force 26 is that of a weight or spring and the motor shaft 17 drives the clock-work.

It will be noted that the friction in the rotating or recording element will have no effect on the accuracy of any of the metering schemes discussed. This fact will result in considerable advantage where it is desirable to connect a demand meter of the printometer type to the register, as it is a well known fact that the friction produced by such auxiliary devices, affects the accuracy of watthour meters at light load. The fact that the friction or load of the rotating element will have no effect on the speed of the disk will make it possible to connect the generator end of an electric tachometer to the motor shaft while the indicating end of the tachometer could be equipped with a scale to read in gallons of water per minute, pounds of steam per minute, etc. The indicator could be placed at any remote location.

There will be a small amount of friction at the bearings of the balance arm. This friction will tend to make the balance arm stick, and, at the time the circuit is being closed at contacts 12 and 13, a little extra force will be required to move the arm because of this friction. This will result in the meter running a little slow, but, after the motor has been started, the same friction will keep the circuit closed a little longer than it should. This will result in the meter running a little fast. From the above it is obvious that this friction will produce positive and negative errors of the same magnitude and will in the end give a resultant error of zero.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a device of the kind described, a contact, a circuit closing arm mounted for oscillation to and from the contact, means operated by a non-magnetic static force adapted to urge said arm toward the contact, an electro-magnetic torque device tending to rotate said arm and including a rotative element, a motor connected to said element to rotate the same, a source of electro-motive energy, and circuit connections between the arm and source of energy and between the contact and source of energy and including the motor.

2. In a device of the kind described, a contact, a circuit closing arm mounted for oscillation to and from the contact, means operated by a non-magnetic static force adapted to urge said arm toward the contact, an electro-magnetic torque device tending to rotate said arm and including a rotative element, a motor connected to said element to rotate the same, a source of electro-motive energy, circuit connections between the arm and source of energy and between the contact and source of energy and including the motor, and a condenser bridged across said circuit connections.

3. In a device of the class described, a contact, a circuit closing arm mounted for oscillation to and from the contact, means operated by a non-magnetic static force adapted to urge said arm toward the contact, an electro-magnetic torque device including a permanent magnet and a metallic disk having a portion of its periphery in the magnetic field of said magnet, one member of said torque device having said arm connected thereto, a motor operatively connected to the other member of the torque device to rotate the same about an axis, a source of electric energy, and conductive connections connecting the source of energy, motor, contact and arm in series.

4. In a device of the class described, a contact, a circuit closing arm mounted for oscillation to and from the contact, means operated by a non-magnetic static force adapted to urge said arm toward the contact, an electro-magnetic torque device including a permanent magnet and a metallic disk having a portion of its periphery in the magnetic field of said magnet, one member of said torque device having said arm connected thereto, a motor operatively connected to the other member of the torque device to rotate the same about an axis, a source of electric energy, conductive connections connecting the source of energy, motor, contact and arm in series, and a condenser bridging the connections to the arm and contact.

5. In a device of the kind described, a contact, a circuit closing arm mounted for oscillation to and from the contact, means operated by a non-magnetic static force adapted to urge said arm toward the contact, an electro-magnetic torque device tending to rotate said arm and including a rotative element, a motor connected to said element to rotate the same, a source of electro-motive energy, circuit connections between the arm and source of energy and between the contact and source of energy and including the motor, and an integrating device operated by said motor.

6. In a device of the kind described, a contact, a circuit closing arm mounted for oscillation to and from the contact, means operated by a non-magnetic static force adapted to urge said arm toward the contact, an electro-magnetic torque device tending to rotate said arm and including a rotative element, a motor connected to said element to rotate the same, a source of electro-motive energy, circuit connections between the arm and source of energy and between the contact and source of energy and including the motor, a condenser bridged across said circuit connections, and an integrating device operated by said motor.

7. In a device of the class described, a contact, a circuit closing arm mounted for oscillation to and from the contact, means operated by a non-magnetic static force adapted to urge said arm toward the contact, an electro-magnetic torque device including a permanent magnet and a metallic disk having a portion of its periphery in the magnetic field of said magnet, one member of said torque device having said arm connected thereto, a motor operatively connected to the other member of the torque device to rotate the same about an axis, a source of electric energy, conductive connections connecting the source of energy, motor, contact and arm in series, and an integrating device operated by said motor.

8. In a device of the class described, a contact, a circuit closing arm mounted for oscillation to and from the contact, means operated by a non-magnetic static force adapted to urge said arm toward the contact, an electro-magnetic torque device including a permanent magnet and a metallic disk having a portion of its periphery in the magnetic field of said magnet, one member of said torque device having said arm connected thereto, a motor operatively connected to the other member of the torque device to rotate the same about an axis, a source of electric energy, conductive connections connecting the source of energy, motor, contact and arm in series, a condenser bridging the connections to the arm and contact, and an integrating device operated by said motor.

9. In a device of the class described, a magnet, an element for cutting the magnetic field produced by said magnet, a motor for causing relative movement between said magnet and said element for producing a drag, conductive connections in circuit with said motor, means operated by a non-magnetic static force tending to operate against the said drag, and circuit controlling means for said circuit connections operatively actuated by said force operated means whereby to produce speeds of the motor proportional to variations in said force operated means.

10. In a device of the class described, a magnet, an element for cutting the magnetic field produced by said magnet, a motor for causing relative movement between said magnet and said element for producing a drag, conductive connections in circuit with said motor, means operated by a non-magnetic static force tending to operate against the said drag, circuit controlling means for said circuit connections operatively actuated by said force operated means whereby to produce speeds of the motor proportional to variations in said force operated means, and a condenser bridged across said conductive connections in circuit with said motor.

In testimony whereof I affix my signature.

W. C. WOODSON, Jr.